(12) United States Patent
Nishii et al.

(10) Patent No.: US 6,604,202 B1
(45) Date of Patent: Aug. 5, 2003

(54) LOW POWER PROCESSOR

(75) Inventors: Osamu Nishii, Inagi (JP); Masayuki Miyazaki, Kokubunji (JP); Kiyoo Itoh, Higashikurume (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/442,148

(22) Filed: Nov. 18, 1999

(30) Foreign Application Priority Data

Nov. 20, 1998 (JP) ............................................. 10-330541

(51) Int. Cl.$^7$ .............................. G06F 1/32; G06F 9/30
(52) U.S. Cl. ...................... 713/324; 713/300; 713/320; 712/208; 712/209
(58) Field of Search ................................ 713/324, 320, 713/300; 712/43, 208, 209; 365/205, 208; 327/534, 536, 532; 307/475

(56) References Cited

U.S. PATENT DOCUMENTS

| | | | | |
|---|---|---|---|---|
| 4,920,284 A | * | 4/1990 | Denda ........................... | 326/68 |
| 5,557,231 A | * | 9/1996 | Yamaguchi et al. ......... | 327/534 |
| 5,987,616 A | * | 11/1999 | Suzuki ......................... | 712/43 |
| 5,996,083 A | * | 11/1999 | Gupta et al. ................. | 713/322 |
| 6,407,956 B2 | * | 6/2002 | Ooishi .......................... | 365/205 |
| 6,477,654 B1 | * | 11/2002 | Dean et al. .................. | 713/300 |

FOREIGN PATENT DOCUMENTS

| | | |
|---|---|---|
| JP | 8-274620 | 10/1996 |
| JP | 10-20959 | 1/1998 |

OTHER PUBLICATIONS

Proceeding STARC Symposium, Sep. 1998, pp. 100–109.
Technical Report of IEICE, Jun. 1995, ICD95–41, pp. 1–8.
IEEE Journal of Solid–State Circuits, vol. 31, No. 11, Nov. 1996, pp. 1770–1779.

* cited by examiner

Primary Examiner—Thomas Lee
Assistant Examiner—Paul Yanchus
(74) Attorney, Agent, or Firm—Mattingly, Stanger & Malur, P.C.

(57) ABSTRACT

In order to save a sub-threshold leak current during operation of processor, a decision circuit (instruction decoder) inputs an instruction signal and outputs an operation mode signal regarding the level of a leak current based on information about use of the circuit block. Thereby, a sub-threshold leak current in the circuit block not used can be saved.

17 Claims, 7 Drawing Sheets

FIG. 3

| | INSTRUCTION | THE INSTRUCTION USES THE CIRCUIT BLOCK 1 | THE INSTRUCTION USES THE CIRCUIT BLOCK 2 | THE INSTRUCTION USES THE CIRCUIT BLOCK 3 |
|---|---|---|---|---|
| 301 — 000x xxxx xxxx xxxx | INSTRUCTION 1 | Y | N | N |
| 302 — 001x xxxx xxxx xxxx | INSTRUCTION 2 | N | Y | N |
| 303 — 010x xxxx xxxx xxxx | INSTRUCTION 3 | N | N | Y |
| 304 — 011x 00xx xxxx xxxx | INSTRUCTION 4 | N | N | N |
| 305 — 011x 01xx xxxx xxxx | INSTRUCTION 5 | N | Y | N |
| 306 — 011x 10xx xxxx xxxx | INSTRUCTION 6 | N | Y | Y |
| 307 — 011x 11xx xxxx xxxx | INSTRUCTION 7 | N | Y | N |
| 308 — 100x xxxx xxxx xxxx | INSTRUCTION 8 | N | N | N |
| 309 — 101x xxxx xxxx xxxx | INSTRUCTION 9 | N | N | N |
| 310 — 110x xxxx xxxx xxxx | INSTRUCTION 10 | Y | N | N |
| 311 — 111x xxxx xxxx xxxx | INSTRUCTION 11 | N | Y | N |

312     313   315
                    314

LOW POWER PROCESSOR

BACKGROUND OF THE INVENTION

1. Field of the Invention

The present invention relates to a CMOS integrated circuit.

2. Description of the Related Art

The related art which is known as the technique to save electrical power of an information processor relates to 1Ratio-less in CMOS design;

2Sleep/Standby condition and stop of clock in this condition.

The item 1 means that CMOS gate consumes only a sub-threshold leak current when an input is high level or low level. The term "leak current" used in this specification means sub-threshold leak current, namely a steady leak current in such a condition that the input of CMOS gate is defined as high level or low level. Therefore, the charge and discharge current and switching transient current of CMOS circuit can be saved but the leak current cannot be saved in the sleep/standby condition by executing the items 1and 2.

The cited reference, Proceeding STARC Symposium, Sept. 1998, (Held in Tokyo), pp.100–109, discloses a leak current.

A leak current is determined by the threshold value voltage of MOS transistor. Here, there is a relationship that the smaller the threshold value voltage is, the larger the leak current becomes. According to this cited reference p.103, when a circuit is composed of a million transistors and is operated under the temperature of 125° C., a leak current becomes 5 mA for the threshold value voltage of 0.3V, meanwhile a leak current becomes 1A for the threshold value voltage of 0.1V as illustrated in the figure. On the other hand, it is also known that when power source voltage is defined as Vcc and threshold value voltage as Vt, a drive current of MOS transistor is proportional to the square of (Vcc−Vt). Therefore, if it is requested to raise the operation rate, the threshold value voltage must be set to a lower value and thereby a leak current increases.

The technique to save the leak current is described in the Technical Report of IEICE (the institute of electronics, information and communication engineers), June 1995, ICD95–41, pp.1–8. In this technique, a MOS transistor of higher threshold value is provided as a power switch in addition to an ordinary logical circuit to reduce a leak current during non-operating condition. Moreover, the Proceeding STARC symposium also describes that a MOS transistor of higher threshold value is used for switching of the circuit during the standby mode.

Moreover, IEEE Journal of Solid-State Circuits, Vol. 31, No.11 (Nov. 1996) pp1770–1779 describes that a leak current during the non-operating condition is lowered by controlling a substrate bias of MOS transistor during the standby mode to raise the threshold value voltage.

Moreover, the Japanese Unexamined Patent Publication No. HEI 8-274620 discloses an LSI covering the operation mode in which the threshold value voltage of MOS transistor is raised by controlling a substrate potential in order to save the power consumption through reduction of a leak current of CMOS.

However, these references do not describe how the leak current control is started and ended or describes that such start and end of control is performed by interruption control or mode control which is not related to the operation (instruction) to be executed by the circuit. Namely, a control system for controlling power consumption of the circuit has been provided in addition to the control system for controlling the execution (arithmetic operation).

Meanwhile, another technique for realizing low power consumption of processor is disclosed in the Japanese Unexamined Patent Publication No. HEI 10-20959. In this cited reference, a power control field is provided within the instruction code and thereby the microprocessor operates only the necessary function blocks by decoding the power control field. However, it is also described that a method for controlling the feeding of power supply and a method for controlling the feeding of clock signal are proposed as the method of controlling the electrical power.

However, the practical circuit for controlling the feeding of power supply is never disclosed and moreover, a steady leak current which flows even when the input of the CMOS gate is defined as the high level or low level is never described.

The technique for saving leak current during execution has never been known in the CMOS logical circuit, particularly in the processor in which the leak current is never neglected. Various references listed above for saving the leak current are related only to the particular condition in which the processor as a whole is not-operated and to the standby mode and do not yet describe the process to automatically reduce the leak current in relation to the arithmetic execution of processor.

The problem to be solved by the present invention relates to reduction of leak current during execution of processor.

Particularly when the threshold value of CMOS is low in order to raise the operation rate, reduction of leak current has an important meaning for reduction of power consumption because when the circuit is composed of a million transistors and is operated under the temperature of 125° C., if the threshold value is 0.1V, a leak current becomes a value as large as 1A as described in the proceeding of STARC Symposium. Nowadays, it is well known that a highly precision LSI has the integration density of a million transistors or more.

SUMMARY OF THE INVENTION

In the processor having a plurality of circuit blocks in which at least one circuit block is used by the instruction signal included in the instruction set, it is decided whether the instruction signal is decoded and a circuit block is used by such instruction signal or not, the circuit block used allows a large leak current (a current flowing to the source and drain path connected in direct of CMOS when the gate to source voltage of PMOS or NMOS forming CMOS is 0V) to flow and the leak current is controlled to become low level for the circuit blocks not used.

Particularly, in the processor to execute the pipeline control, a control signal for controlling leak current is transferred in synchronization with the pipeline stage. Therefore, a high level leak current is allowed to flow into the circuit block in the pipeline stage for the arithmetic execution and the leak current is then controlled to a low level upon completion of the pipeline stage.

In addition, in this case, the leak current control is performed prior to the arithmetic execution of circuit block considering that the transitional condition for the leak current control does not give any influence on the arithmetic execution.

An example of circuit block is an ALU (Arithmetic Logical Unit) and when an instruction to use ALU is executed, the execution mode in which the leak current of ALU is high level is designated. On the occasion of executing the instruction for not using ALU, the execution mode in which the leak current of ALU is low level is designated. It is enough for the judging circuit to issue a designating signal regarding the level of leak current of ALU on the basis of the information that an instruction designates use of ALU or not and therefor it is concluded to decoding of instruction.

Another example of the circuit block is FPU (Floating Point Arithmetic Unit) and this circuit block is used to execute the FPU instruction by the instruction signal. Another example is a data memory which is used only when the instruction signal includes the loading execution (read from data memory) or store execution (write to data memory).

As explained above, the operation mode in which a leak current is high is applied when the circuit block requests operation and the operation mode in which a leak current is low is applied when the circuit block does not request operation. Thereby, the leak current generated in useless can be saved.

BRIEF DESCRIPTION OF THE DRAWINGS

FIG. 3 is a table of instruction set used in the example illustrated in FIG. 2.

DETAILED DESCRIPTION OF THE PREFERRED EMBODIMENTS

Embodiment 1

Figure 1:
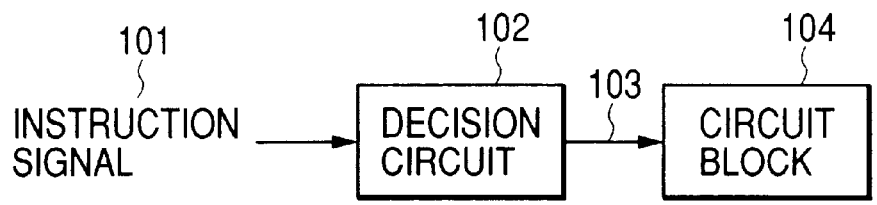
FIG. 1 is a block diagram of an embodiment including one circuit block.

FIG. 1 is the simplest illustration of the example of the present invention. In this figure, numeral 101 designates an instruction signal of 16 bits. 104, one circuit block. 102, an instruction decoder for making decision on the basis of the information about use of circuit block 104 from an input of the instruction signal 101.

On the basis of result of decision by the instruction decoder 102, the operation mode for deciding the level of leak current of the circuit block 104 is instructed using the signal 103. Namely, when the instruction indicated by the instruction signal 101 uses the circuit block 104, the operation mode in which a leak current is high level is designated and the circuit which does not allow drop of operation rate is operated and when the instruction indicated by the instruction signal 101 does not use the circuit block 104, the operation mode in which the leak current is low level is designated and thereby the leak current may be lowered.

Embodiment 2

Figure 2:
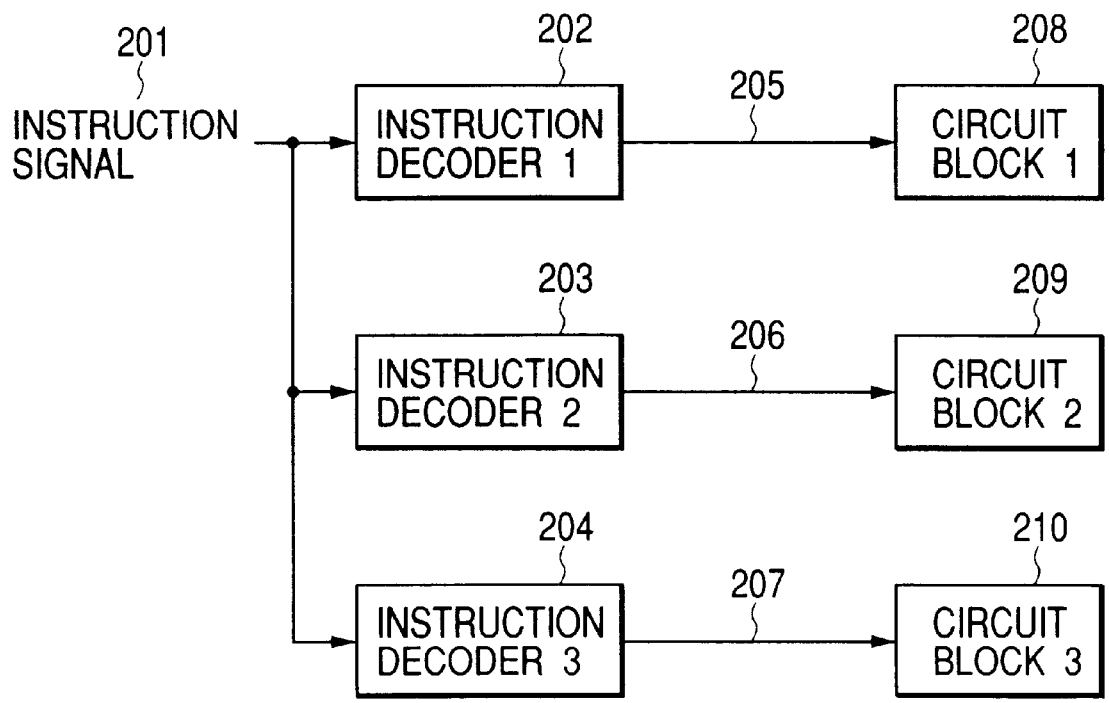
FIG. 2 is a block diagram of an embodiment including three circuit blocks.

FIG. 2 illustrates another embodiment including a plurality of circuit blocks. 201 designates an instruction signal of 16 bits. 208, 209, 210 designate three circuit blocks. 202, 203, 204 designate instruction decoders which input the instruction signal 201 and make decision based on the information about use of the circuit blocks 208, 209, 210. A signal for designating operation mode to decide the level of leak current of the circuit blocks 208, 209, 210 is controlled on the basis of the decision signals 205, 206, 207 of the instruction decoders 202, 203, 204.

Control of such signal for the circuit block 208 will then be explained. When the instruction expressed by the signal 201 uses the circuit block 208, the operation mode in which the leak current is high level is designated to operate the circuit which does not result in drop of operation rate. When the instruction expressed by the signal 201 does not use the circuit block 208, the operation mode in which the leak current is low level is designated to reduce the leak current. This control is also applied to the circuit blocks 209 and 210. Since the condition equation for use/non-use of the circuit blocks 208, 209, 210 is generally set up individually, the instruction decoders 202, 203, 204 are required individually for designating different operation modes.

FIG. 3 is a table indicating the instruction set used in the circuit illustrated in FIG. 2 and the circuit block used by the instruction. 301 to 311 designate respective instructions provided in the instruction set. Column 312 is a title of instruction. Here, the instructions from 1 (301) to 11 (311) are described. In an example, one instruction is add instruction, one instruction is load instruction and one instruction is branch instruction.

Column 313 indicates that each instruction uses or does not use a circuit block 1 (208). When Y is entered in the column, it means use of the circuit block 1 (208). When N is entered, it means non-use of the circuit block 1(208). The circuit block 1 (208) is used by the instruction 1 and instruction 10. In the same manner, column 314 indicates that each instruction uses or does not use the circuit block 2 (209). Column 315 indicates that each instruction uses or does not use the circuit block 3 (210).

Figure 4:
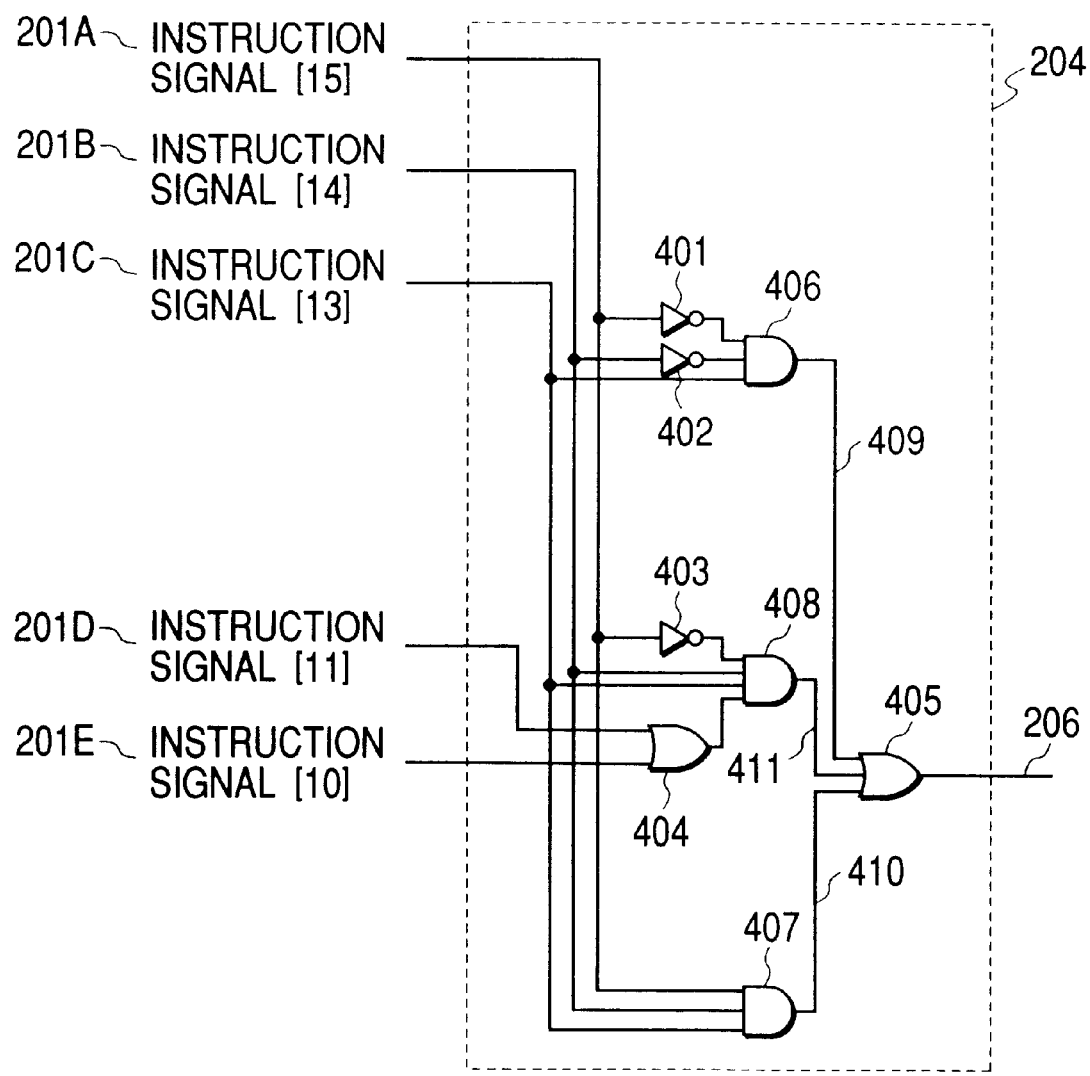
FIG. 4 is a logical circuit diagram of an instruction decoder 203 used in the example of FIG. 2.

FIG. 4 illustrates an example of structure of the instruction decoder 204. For example, as illustrated in column 315 of FIG. 3, the circuit block 2 (209) is used by the instructions 2, 5, 6, 7, 11. The decoder 204 decodes the instructions 2, 5, 6, 7, 11 to output 1 as the output signal 206. 401, 402, 403 designate inverters (logical inverters). 404 designates a two-input OR(logical sum) gate. 405 designates a three-input OR gate. 406, 407 designate three-input AND (logical product) gate. 408 designates four-input AND gate.

Operation of this circuit will be understood with the basic knowledge of combination logic. An output 409 of the gate 406 becomes 1 when instruction signal [15:13]=001. Namely, the instruction 2 (302) is decoded. In the same manner, an output 410 of the gate 407 decodes the instruction 5–7 (305–307). In the same manner, an output 411 of the gate 408 decodes the instruction 11 (311).

An output 206 of the gate 405 decodes the instructions 2, 5, 6. 7, 11 by obtaining logical sum (OR) of the signals 409, 410, 411. Namely, when the instruction signal 201 is the instructions 2, 5, 6, 7, 11, the signal 206 becomes 1.

Embodiment 3

Figure 5:
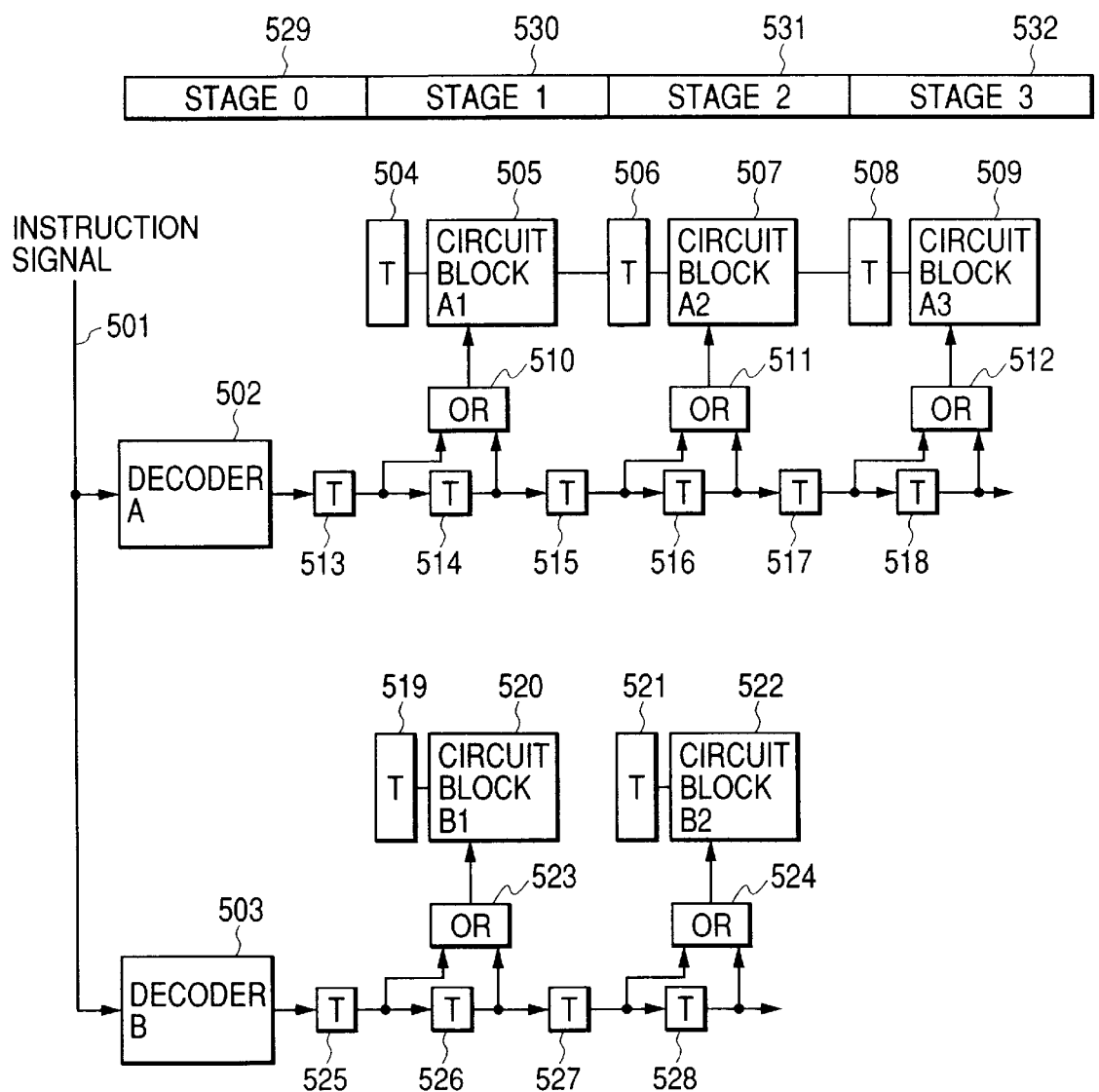
FIG. 5 is a block diagram of the embodiment in which the present invention is applied to a pipeline type processor.

FIG. 5 illustrates another embodiment. In this embodiment, the processor introduces the pipeline control system. In the pipeline control system, an execution hardware is provided in every pipeline stage and a timing latch is provided between the pipeline stages. 529–532 indicate the pipeline stage (physical indication of pipeline stage does not actually exist and such pipeline stage is described only for explanation). 501 designates the instruction signal. 502, 503 are instruction decoders. 504, 506, 508, 513–518, 519, 521, 525–528 are timing latches. 505, 507, 509 are circuit blocks and use or non-use of such circuit blocks are decided by the instruction decoder 502. Moreover, 505, 507, 509 are hardwares used by the pipeline stages 530, 531, 532. 520, 522 are circuit blocks and use or non-use of these circuit blocks is decided by the instruction decoder 503. Moreover, 520, 522 are hardwares used by the pipeline stages 530, 531.

The data pipeline-controlled by the circuit block corresponding to the instruction decoder 502 is processed via 504, 505, 506, 507, 508 and 509. The other data pipeline-controlled by the circuit block corresponding to instruction decoder 503 is processed via 520, 521, 522. 510, 511, 512, 523, 524 are two-input OR gate.

Figure 6:
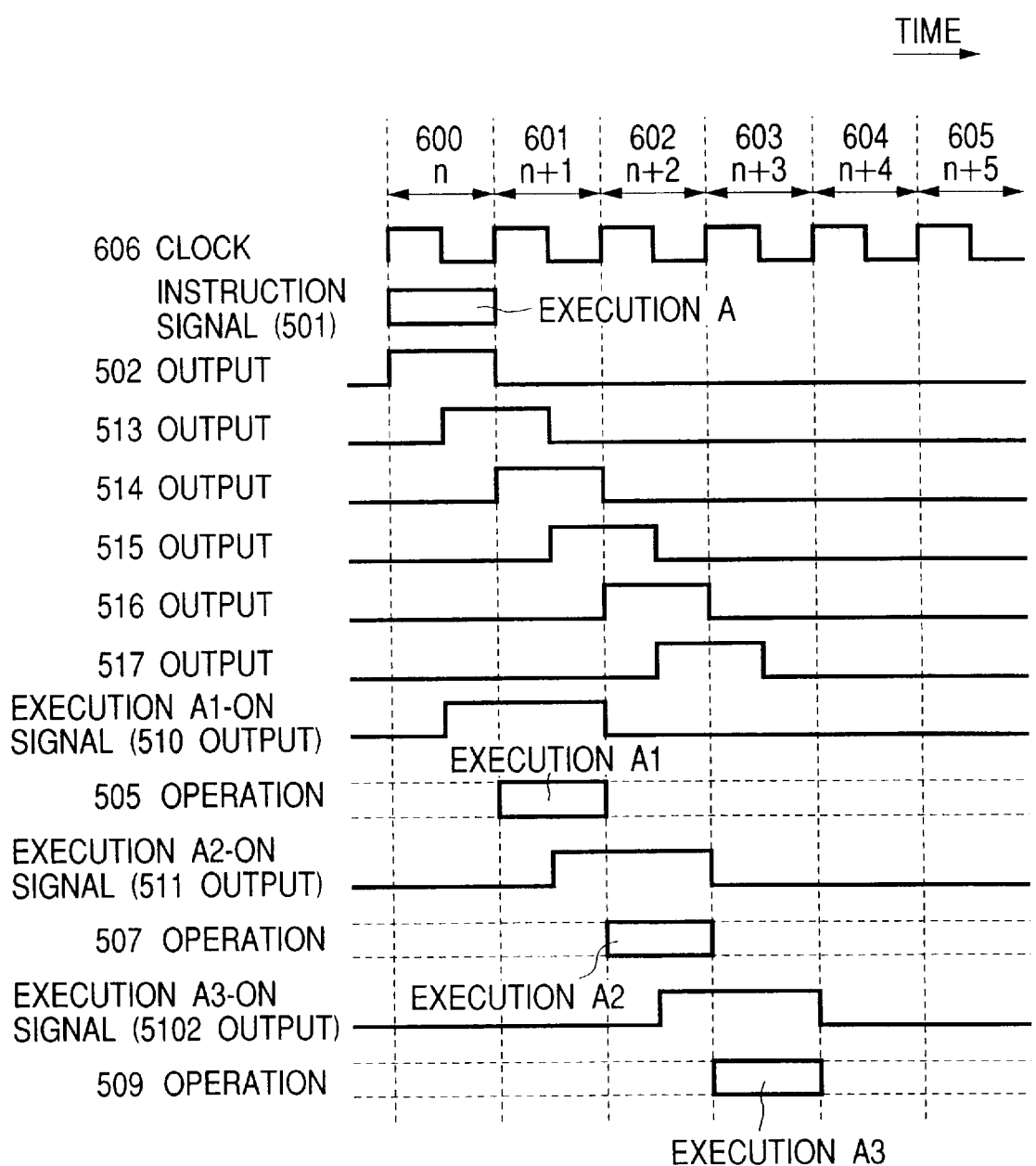
FIG. 6 is a timing chart when one instruction is executed in the example of FIG. 5.

FIG. 6 is a timing chart of the circuit illustrated in FIG. 5. The lateral axis is the time axis. In a certain period(600), the instruction signal 501 designates the arithmetic operation A. The time length of the period 600 is assumed as one clock. In this case, the processor performs pipeline control and uses the circuit block A1(505) in the period 601 (it can be well understood by describing that the arithmetic operation 505 is performed). In the period 602, the circuit block A2 (507) is used. In the period 603, the circuit block A3 (509) is used. In this case, a use instruction signal output from the instruction decoder 502 is transferred to the pipeline to have the signal waveform of 513–518 illustrated in the figure. As a result, the high level signal of 1.5 clock time is impressed to the circuit blocks A1(505), A2(506) and A3(507). The first 0.5 clock among the 1.5 clock includes the time required as the transition condition for shifting the circuit block to the high level leak condition from the low level leak condition.

Embodiment 4

Figure 7:
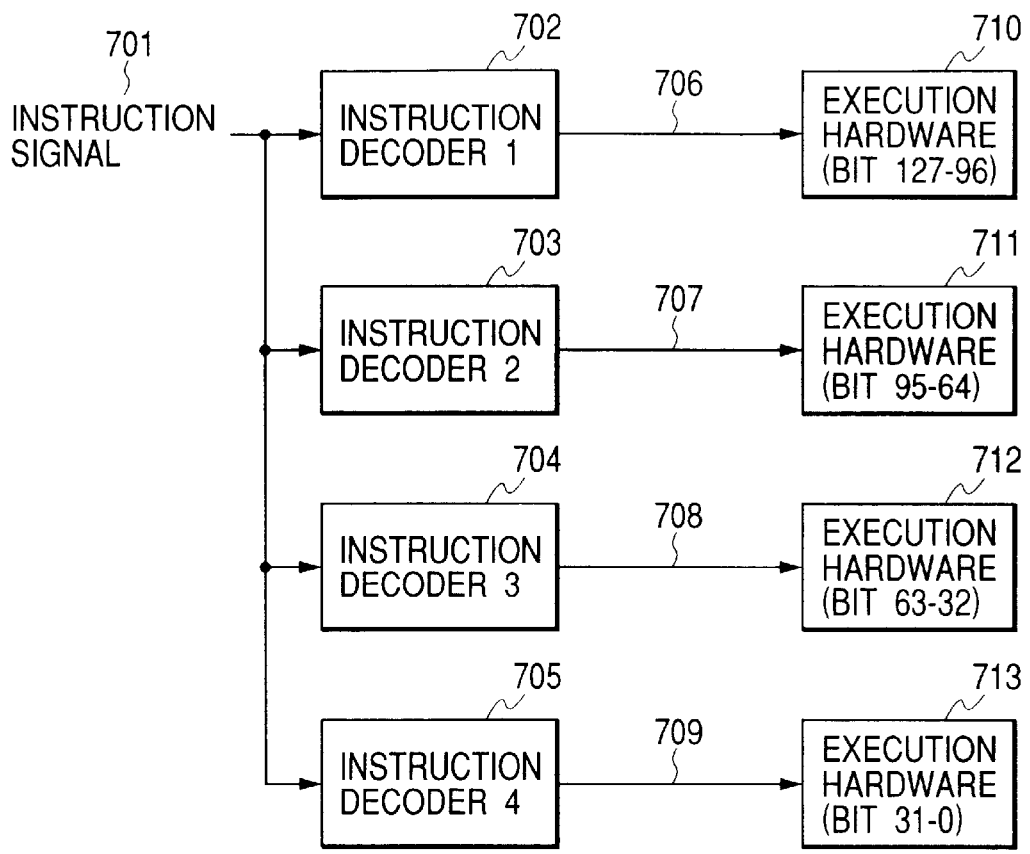
FIG. 7 is a block diagram of the embodiment in which the present invention is applied to a single instruction multiple data type processor.

FIG. 7 illustrates the other embodiment of the present invention which is an example of application into SIMD (single instruction multiple data processor. In this embodiment, for execution hardwares of 32-bit width are provided in parallel but the hardwares 0–4 among these hardwares are used and the number hardwares to be used is different depending on the instruction.

Four execution hardwares of 32-bit width are designated by 710 to 713. For 710, 711, 712, 713, the bit numbers 127–96, 95–64, 65–32, 31–0 are assigned for internal process.

A certain instruction executes the arithmetic operation of 128 bits to conduct the arithmetic operation;

*dest*[127:0]=*src*1[127:0]*op src*2[127:0]

Here, src1, src2 are input data of arithmetic operation and dest indicates the area where the result of arithmetic execution is substituted. [a:b] is a notation indicating the bit numbers a to b. op designates general arithmetic execution. For example, in the case of addition, op is replaced with "+". In this case, four execution hardwares 710–713 are all used.

The other instruction executes the arithmetic operation of 32 bits, namely,

*dest*[31:0]=*src*1[31:0]*opsrc*2[31:0].

In this case, the execution hardware 713 is used but the execution hardwares 710–712 are never used. 701 designates the instruction signal. 702–705 are instruction decoders. The instruction decoders 702–705 decode whether the execution hardwares 710–711 are used or not for respective instructions. When used, the operation mode of low leak condition is instructed using the four control signal lines 706–709 to the execution hardwares 710–713.

For the means for controlling the leak current for each circuit block, a practical example in the circuit diagram level will be explained below.

Figure 8:
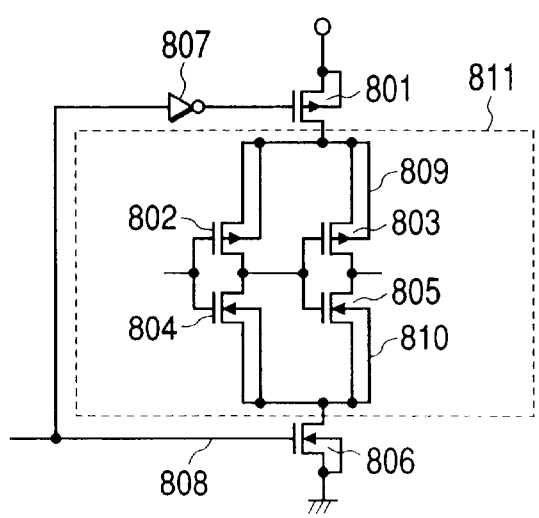
FIG. 8 is a circuit diagram of a leak current control means.

FIG. 8 is an example of the leak current control means. 801–803 designate PMOS. 804–806 designate NMOS. Here, a set of PMOS 802 and NMOS 804 or a set of PMOS 803 and NMOS 805 is forming a CMOS inverter. These two inverters are described as the typical internal circuits of the circuit block for the convenience of explanation. The node 809 (local positive power supply line) to which the source terminals of PMOS 802, 803 are connected is connected to the positive power supply via PMOS 801. Moreover, the node 810 (local ground line) to which the source terminals of NMOS 804, 805 are connected is connected to the ground via NMOS 806. In addition, the substrate potential of the PMOS transistors 802, 803 is connected to the positive power supply line 809, while the substrate potential of NMOS transistors 804, 805 to the local ground line 810. The MOS transistors 801, 806 are operating as the switch MOS transistors. Of course, even when any one of the MOS transistors 801, 806 is provided, it can operate as the switch MOS transistor.

The threshold value voltage Vtp of PMOS801 is higher than the threshold value voltage of PMOS 802, 803 by 1V (namely does not easily leak). The threshold value voltage Vtn of NMOS 806 is higher than that of NMOS 804, 805 by 1V (namely not easily leak). When there is no difference of threshold value, even when the switch MOS transistors 801, 806 are controlled to the OFF condition, the leak current of switch MOS transistors 801, 806 does not become smaller than that of the internal circuit and therefore the effect of power consumption cannot be realized.

In order to save leak current, leak current saving is designated by the control signal 808. In this example, Low designates low leak current, while High designates high leak current. The control signal 808 controls the gate of NMOS 806 and its inverted signal (output of inverter 807) controls the gate of PMOS 801. Therefore, when the control signal 808 is low, the MOS transistors 801, 806 which do not leak easily become low leak (stronger OFF condition), and therefore the leak current may be saved.

Figure 9:
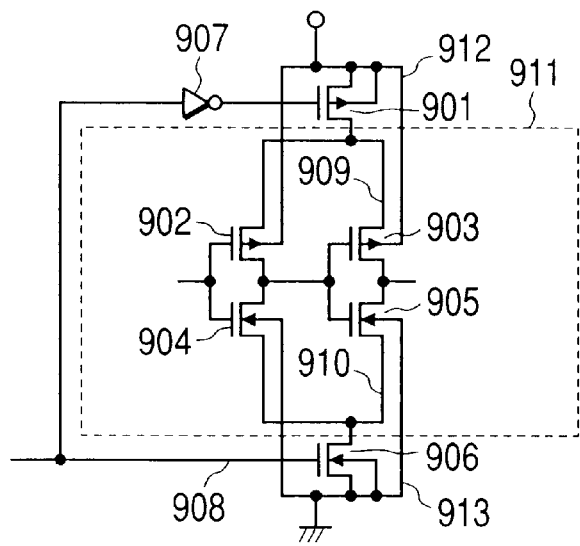
FIG. 9 is a circuit diagram of a leak current control means.

FIG. 9 illustrates another example of the leak current control means. 901–910 in FIG. 9 are identical respectively to 801 to 810 in FIG. 8 and therefore the same explanation will be omitted here. Difference from the circuit of FIG. 8 is that the substrate potential of PMOS 902, 903 is connected to the true positive power supply line 912 in place of the local positive power supply line 909 and the substrate potential of NMOS 904, 905 is connected to the true ground line 913 in place of the local ground line 910.

When this structure is introduced, since the local positive power supply line 909 and local ground line 910 respectively occur the power supply drop against the true positive power supply line 912 and true ground line 913 under the condition that the switch MOS transistors 901, 906 are in the OFF condition, the substrate potential bias effect is generated, resulting in the merit that the internal inverter itself can save the leak current.

Figure 10:
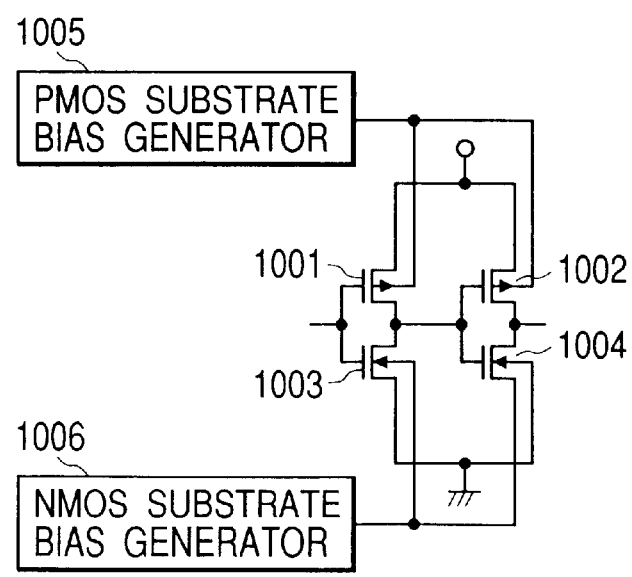
FIG. 10 is a circuit diagram of a leak current control means.

FIG. 10 is the other example of the leak current control means. The substrate potential of PMOS 1001, 1002 can be controlled by the PMOS substrate bias generator 1005. In the same manner, the substrate potential of NMOS 1003, 1004 is controlled by the NMOS substrate bias generator 1006. As in the case of FIG. 8, the internal two inverters are described as the typical internal circuits of the circuit block. The higher the substrate potential of PMOS is, the lesser the leak current is. The lower the substrate potential of NMOS is, the lesser the leak current is. As an example, in the operation mode where the leak current is high level, the PMOS substrate potential is assumed as the positive power supply voltage and NMOS substrate potential is assumed as the ground power supply potential. In the operation mode in which the leak current is low level, the PMOS substrate potential is assumed as positive power supply voltage +1.0V and NMOS substrate potential as the ground power supply voltage −1.0V.

Moreover, SOI may also be used for substrate. Introduction of SOI is effective for reduction of capacity of depletion layer under the gate and tailing coefficient (inverse number of gradient of Vgs-logIds characteristic) and reduction of sub-threshold current.

As explained above, according to the present invention, operation is controlled by the instruction signal for each circuit block to reduce the leak current during operation of the processor. Particularly, when the threshold value of CMOS is low in order to raise the operation rate, reduction of leak current is truly useful for reduction of power consumption.

What is claimed is:

1. A processor which executes an instruction included in an instruction set, comprising:
   a plurality of circuit blocks, each of circuit blocks including a first insulated-gate field-effect transistor;
   an instruction decoder which decodes the instruction and generates a control signal for controlling an operating condition of the circuit block; and
   a transfer line which transfers the control signal;
   wherein the control signal is transferred so that a circuit block respectively used in a particular pipeline stage receives the control signal according to the particular pipeline stage,
   each of the plurality of circuit blocks is set to the first operation condition depending on receiving the control signal from the second operation condition,
   first current flows through source-drain path of the first insulated-gate field-effect transistor even when a source-gate voltage is set 0V in the first operating condition, and
   second current lower than the first current flows through source-drain path of the first insulated-gate field-effect transistor even when the source-gate voltage is set 0V in the second operating condition.

2. The processor according to claim 1, wherein the control signal is received by the circuit respectively used in the particular pipeline stage prior to a start of the particular pipeline stage.

3. The processor according to claim 1, wherein the circuit block respectively used in the particular pipeline stage is set to the second operating condition after the end of the use of the circuit block in the particular pipeline stage.

4. The processor according to claim 1, wherein a substrate potential of the first insulated-gate field-effect transistor is controlled so that an absolute value of a threshold voltage of the first insulated-gate field-effect transistor in the second operating condition is larger than the absolute value of the threshold voltage of the first insulated-gate field-effect transistor in the first operating condition.

5. The processor according to claim 1, wherein each of the plurality of circuit blocks includes a second insulated-gate field-effect transistor connected to the first insulated-gate field effect transistor in series, and wherein the second insulated-gate field effect transistor is in an on state in the first operating condition and is in an off state in the second operating condition.

6. The processor according to claim 5, wherein an absolute value of a threshold voltage of the second insulated-gate field-effect transistor is larger than an absolute value of a threshold voltage of the first insulated-gate field-effect transistor.

7. The processor according to claim 5, wherein a well of the first insulated-gate field-effect transistor is connected to a source of the second insulated gate field-effect transistor.

8. A method of reducing a power consumption of a processor which executes an instruction included in an instruction set, comprising:
   providing the processor comprising a plurality of circuit blocks, each of the circuit blocks including a first insulated-gate field-effect transistor;
   decoding the instruction;
   generating a control signal for controlling an operating condition of the circuit block;
   transferring the control signal to a circuit block respectively used in a particular pipeline stage; and
   setting an operating condition of the circuit block respectively used in a particular pipeline stage according to receipt of the control signal from a second operating condition to a first operating condition;
   wherein first current flows through source-drain path of the first insulated-gate field-effect transistor even when a source-gate voltage is set 0V in the first operating condition, and
   second current lower than the first current flows through source-drain path of the first insulated-gate field-effect transistor even when the source-gate voltage is set 0V in the second operating condition.

9. The method of reducing the power consumption according to claim 8, wherein the circuit block respectively used in a particular pipeline stage receives the control signal before a start of the particular pipeline stage.

10. The method of reducing the power consumption according to claim 8, further comprising:
    setting the operating condition of the circuit block respectively used in the particular pipeline stage from the first operating condition to the second operating condition after the end of the use of the circuit block in the particular pipeline stage.

11. A processor comprising a plurality of circuit blocks used by the instruction signal included in the instruction set and an instruction decoder for decoding said instruction signal to output a control signal for designating use of a plurality of said circuit blocks; wherein
    a plurality of said circuit blocks are used respectively in the predetermined pipeline stage and said control signal is transferred in synchronization with said pipeline stage;
    a plurality of said circuit blocks include a complimentary MOSFET having a first P-channel MOSFET and a first N-channel MOSFET connected in series between a first potential and a second potential;
    said circuit block is set to the first operating condition depending on transfer of said control signal and to the second operating condition depending on the end of use of said circuit block;
    first current flows into the serially connected source-drain path of said complimentary MOSFET when the gate-source voltage of said first P-channel MOSFET or said first N-channel MOSFET is set to 0V in said first operating condition; and second current lower than said first current flows into the serially connected source-drain path of said complimentary MOSFET when the gate-source voltage of said first P-channel MOSFET or said first N-channel MOSFET is set to 0V in said second operating condition.

12. A processor according to claim 11, wherein said control signal is transferred prior to the start of use of said circuit block, and the period up to the start of use of said circuit block from transfer of said control signal includes the period in which said circuit block shifts to said first operating condition from said second operating condition.

13. A processor according to claim 11, comprising:

first substrate potential generating circuit for generating a substrate potential of said first P-channel MOSFET; and second substrate potential generating circuit for generating a substrate potential of said first N-channel MOSFET; wherein said first potential is impressed to the substrate of said first P-channel MOSFET, while said second potential is impressed to the substrate of said first N-channel MOSFET in said first operating condition of said circuit block; and potential higher than said first potential generated by said first substrate potential generating circuit is impressed to the substrate of said first P-channel MOSFET and potential lower than said second potential generated by said second substrate potential generating circuit is impressed to the substrate of said first N-channel MOSFET in said second operating condition.

14. A processor according to claim 11, wherein a plurality of said-circuit blocks include a second P-channel MOSFET having the source-drain path between said first potential and third potential higher than said first potential and a threshold value voltage higher than the threshold value voltage of said first P-channel MOSFET; and said circuit block sets said second P-channel MOSFET to the ON condition in said first operating condition and sets said second P-channel MOSFET to the OFF condition in said second operating condition.

15. A processor according to claim 14, wherein said third potential is impressed to the substrate potential of said first P-channel MOSFET.

16. A processor according to claim 11, wherein a plurality of said circuit blocks include a second N-channel MOSFET having the source-drain path between said second potential and the fourth potential lower than said second potential and a threshold value voltage higher than the threshold value voltage of said first N-channel MOSFET; and said circuit block sets said second N-channel MOSFET to the ON condition in said first operating condition and also sets said second N-channel MOSFET to the OFF condition in said second operating condition.

17. A processor according to claim 16, wherein said fourth potential is impressed to the substrate potential of said first N-channel MOSFET.

* * * * *